United States Patent
Miura et al.

(10) Patent No.: US 8,952,904 B2
(45) Date of Patent: Feb. 10, 2015

(54) ELECTRONIC DEVICE, SCREEN CONTROL METHOD, AND STORAGE MEDIUM STORING SCREEN CONTROL PROGRAM

(75) Inventors: Saya Miura, Kanagawa (JP); Tsuneo Miyashita, Kanagawa (JP); Yuka Ishizuka, Kanagawa (JP); Tomohiro Sudou, Kanagawa (JP); Junichi Hasegawa, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 310 days.

(21) Appl. No.: 13/271,488

(22) Filed: Oct. 12, 2011

(65) Prior Publication Data
US 2012/0092280 A1  Apr. 19, 2012

(30) Foreign Application Priority Data
Oct. 14, 2010 (JP) .................................. 2010-231666

(51) Int. Cl.
G06F 3/041 (2006.01)
G06F 3/0488 (2013.01)
G06F 1/16 (2006.01)
H04M 1/02 (2006.01)
H04M 1/725 (2006.01)

(52) U.S. Cl.
CPC .......... *G06F 3/04883* (2013.01); *G06F 1/1624* (2013.01); *G06F 1/1643* (2013.01); *G06F 1/1647* (2013.01); *H04M 1/0235* (2013.01); *H04M 1/72552* (2013.01); *H04M 2250/22* (2013.01)
USPC .......................................... 345/173; 345/174

(58) Field of Classification Search
USPC ................................. 345/173–179
See application file for complete search history.

(56) References Cited

U.S. PATENT DOCUMENTS

| | | | | |
|---|---|---|---|---|
| 2005/0030255 A1* | 2/2005 | Chiu et al. | ..................... | 345/1.3 |
| 2007/0085759 A1* | 4/2007 | Lee et al. | ........................ | 345/1.1 |
| 2009/0093277 A1* | 4/2009 | Lee et al. | ..................... | 455/566 |
| 2009/0244016 A1* | 10/2009 | Casparian et al. | ............ | 345/173 |
| 2010/0100855 A1* | 4/2010 | Yoo | ................. | 715/863 |
| 2010/0174987 A1* | 7/2010 | Shin et al. | ..................... | 715/702 |
| 2010/0188352 A1* | 7/2010 | Ikeda | ............................. | 345/173 |

(Continued)

FOREIGN PATENT DOCUMENTS

| | | |
|---|---|---|
| JP | 2009164794 | 7/2009 |
| JP | 2011134001 A | 7/2011 |

(Continued)

OTHER PUBLICATIONS

Office Action mailed Feb. 18, 2014, corresponds to Japanese patent application No. 2010-231666.

*Primary Examiner* — Premal Patel
(74) *Attorney, Agent, or Firm* — Lowe Hauptman & Ham, LLP (57) ABSTRACT

A mobile phone terminal (electronic device) includes a first touch panel and a second touch panel for displaying an object corresponding to an executable function and detect a touch on the object. The mobile phone terminal also includes a control unit that, in a state where the object is displayed on the first touch panel or the second touch panel, when the touch on the object is detected and then a movement of the touch is detected and if the first touch panel or the second touch panel is in a movement direction of the touch, displays a screen provided by a function corresponding to the object on the first touch panel or the second touch panel in the movement direction of the touch.

21 Claims, 9 Drawing Sheets

(56) References Cited

U.S. PATENT DOCUMENTS

| | | | |
|---|---|---|---|
| 2010/0259494 A1* | 10/2010 | Kii | 345/173 |
| 2010/0281363 A1* | 11/2010 | Inaba | 715/702 |
| 2011/0126141 A1* | 5/2011 | King et al. | 715/769 |
| 2011/0154248 A1 | 6/2011 | Tsuruoka | |

FOREIGN PATENT DOCUMENTS

| | | |
|---|---|---|
| JP | 2012502374 A | 1/2012 |
| WO | 2010028405 A1 | 3/2010 |

* cited by examiner

| ID | TOP LEFT COORDINATES | WIDTH | HEIGHT | AREA DIVISION |
|---|---|---|---|---|
| 1 | (0, 480) | 400 | 480 | No |
| 2 | (400, 480) | 400 | 480 | Yes |

| ID | SUB ID | TOP LEFT COORDINATES | WIDTH | HEIGHT |
|---|---|---|---|---|
| 2 | 2-1 | (0, 480) | 400 | 480 |
| 2 | 2-2 | (400, 480) | 400 | 480 |

ELECTRONIC DEVICE, SCREEN CONTROL METHOD, AND STORAGE MEDIUM STORING SCREEN CONTROL PROGRAM

This application claims priority from Japanese Application No. 2010-231666, filed on Oct. 14, 2010, the content of which is incorporated by reference herein in its entirety.

BACKGROUND

1. Technical Field

The present disclosure relates to an electronic device, a screen control method, and a storage medium storing therein a screen control program.

2. Description of the Related Art

Recently, a touch panel is widely used in order to enable an intuitive operation and achieve a compact electronic device without requiring a physically large area for an user interface, such as a keyboard. Japanese Patent Application Laid-open No. 2009-164794 proposes a mobile phone terminal that includes two touch panels and is changed to either one of an open state in which the two touch panels are exposed and a closed state in which only one of the touch panels is exposed.

In the above-discussed electronic devices having a plurality of touch panels, it is previously determined on which of the touch panels a screen to be activated is displayed. For example, when an icon displayed on a first touch panel is tapped, a screen corresponding to the icon is displayed on the first touch panel, and when an icon displayed on a second touch panel is tapped, a screen corresponding to the icon is displayed on the second touch panel.

SUMMARY

According to an aspect, an electronic device includes; a plurality of display units that include a first display unit; a detector for detecting a touch on the first display unit; and a control unit. The first display unit displays an object corresponding to an executable function. The control unit selects, when the touch on the object is detected by the detector and then a movement of the touch is detected thereby, one or more display units for displaying a screen provided by the function corresponding to the object according to the movement of the touch.

According to another aspect, a screen control method is executed by an electronic device including a plurality of display units that include a first display unit and a detector for detecting a touch on the first display unit. The screen control method includes; displaying an object corresponding to an executable function; detecting a touch on the object and a movement of the touch by the detector; and selecting one or more display units for displaying a screen provided by the function corresponding to the object according to the movement of the touch.

According to another aspect, a non-transitory storage medium stores a screen control program for causing, when executed by an electronic device which includes a plurality of display units that include a first display unit and a detector for detecting a touch on the first display unit, the electronic device to execute displaying an object corresponding to an executable function; detecting a touch on the object and a movement of the touch by the detector; and selecting one or more display units for displaying a screen provided by the function corresponding to the object according to the movement of the touch.

DETAILED DESCRIPTION

Exemplary embodiments of the present invention will be explained in detail below with reference to the accompanying drawings. It should be noted that the present invention is not limited by the following explanation. In addition, this disclosure encompasses not only the components specifically described in the explanation below, but also those which would be apparent to persons ordinarily skilled in the art, upon reading this disclosure, as being interchangeable with or equivalent to the specifically described components.

In the following description, a mobile phone terminal is used to explain as an example of the electronic device, however, the present invention is not limited to the mobile phone terminals. Therefore, the present invention can be applied to any type of devices provided with a touch panel, including but not limited to personal handyphone systems (PHS), personal digital assistants (PDA), portable navigation units, personal computers (including but not limited to tablet computers, netbooks etc.), media players, portable electronic reading devices, and gaming device.

Figure 1:
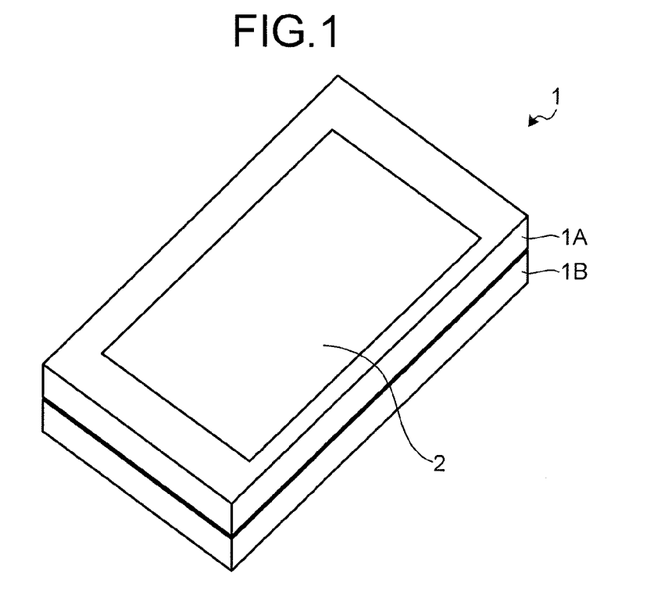
FIG. 1 is a perspective view of a mobile phone terminal in a first form.
Figure 2:
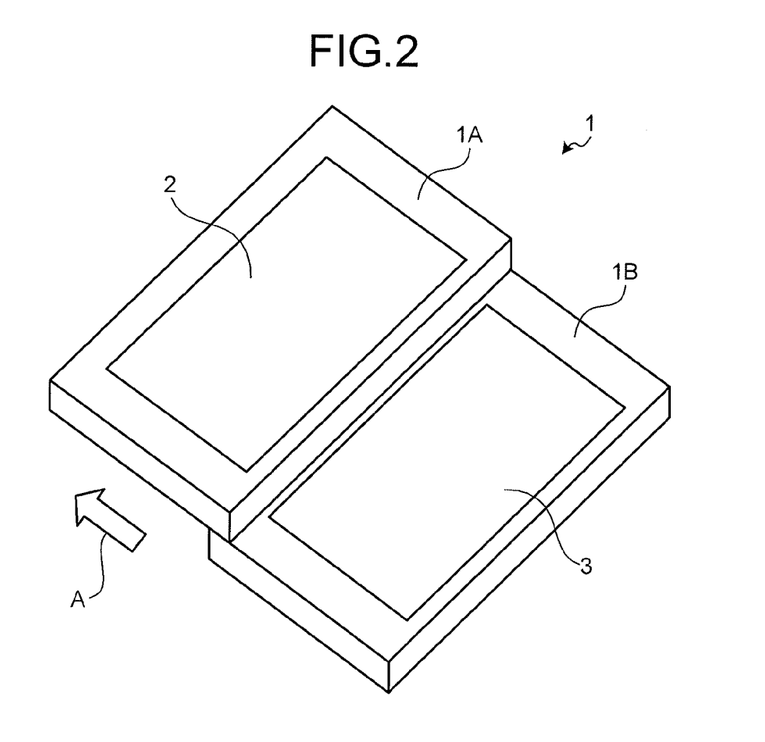
FIG. 2 is a perspective view of the mobile phone terminal in a second form.

First, an overall configuration of a mobile phone terminal 1 as an embodiment of the electronic device according to the present invention will be explained below with reference to FIG. 1 and FIG. 2. FIG. 1 is a perspective view of the mobile phone terminal 1 in a first form, and FIG. 2 is a perspective view of the mobile phone terminal 1 in a second form. The mobile phone terminal 1 includes a first housing 1A and a second housing 1B. The first housing 1A is configured so as to be slidable relative to the second housing 1B in the direction of arrow A.

The first housing 1A includes a touch panel 2 on its face on the side opposite to its face that faces the second housing 1B. The second housing 1B includes a touch panel 3 on its face that faces the first housing 1A. The touch panel 2 and the touch panel 3 display characters, graphics, images, and so on, and detect various operations performed by the user on the touch panel using his/her finger(s), a pen, a stylus or the like (in the description herein below, for the sake of simplicity, it is assumed that the user touches the touch panel 2 and the touch sensor 4 with his/her fingers). The touch panel 3 is covered by the first housing 1A in the first form in which the first housing 1A and the second housing 1B substantially overlap each other, and is exposed to the outside in the second form in which the first housing 1A slides in the direction of arrow A.

The first form is suitable for the user to carry the mobile phone terminal 1, and even in this form, the user can refer to information displayed on the touch panel 2 and operate the touch panel 2 with the finger, to input the information. The second form is suitable for the user to use the mobile phone terminal 1, and thus the user can refer to more information using both the touch panel 2 and the touch panel 3.

In the following explanation, the touch panel 2 sometimes called "first display unit", and the touch panel 3 is sometimes called "second display unit". The touch panel 2 and the touch panel 3 are sometimes called simply "display unit" without specifying which is which.

Figure 3:
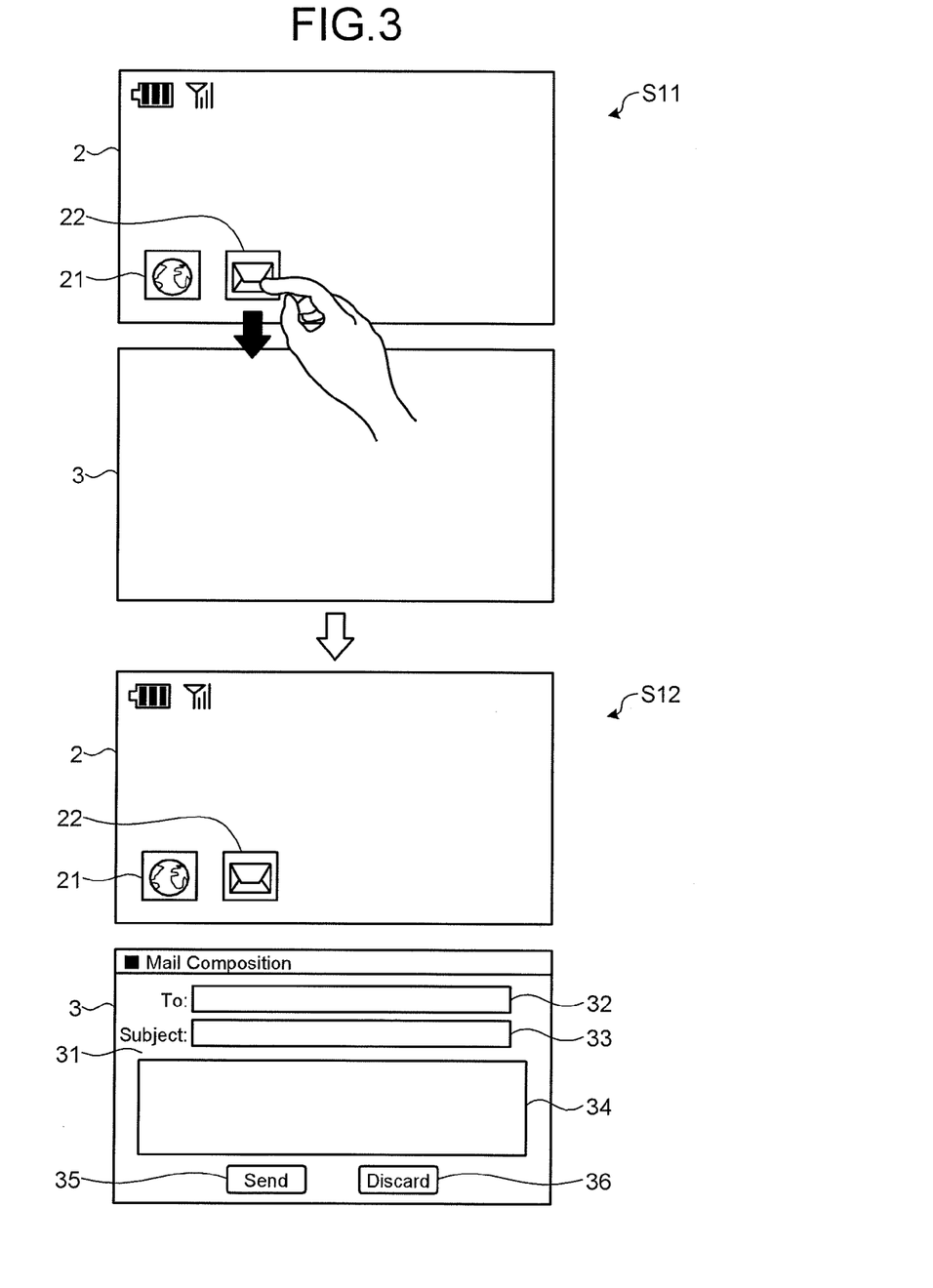
FIG. 3 is a diagram illustrating an example of displaying a screen on a second display unit.
Figure 4:
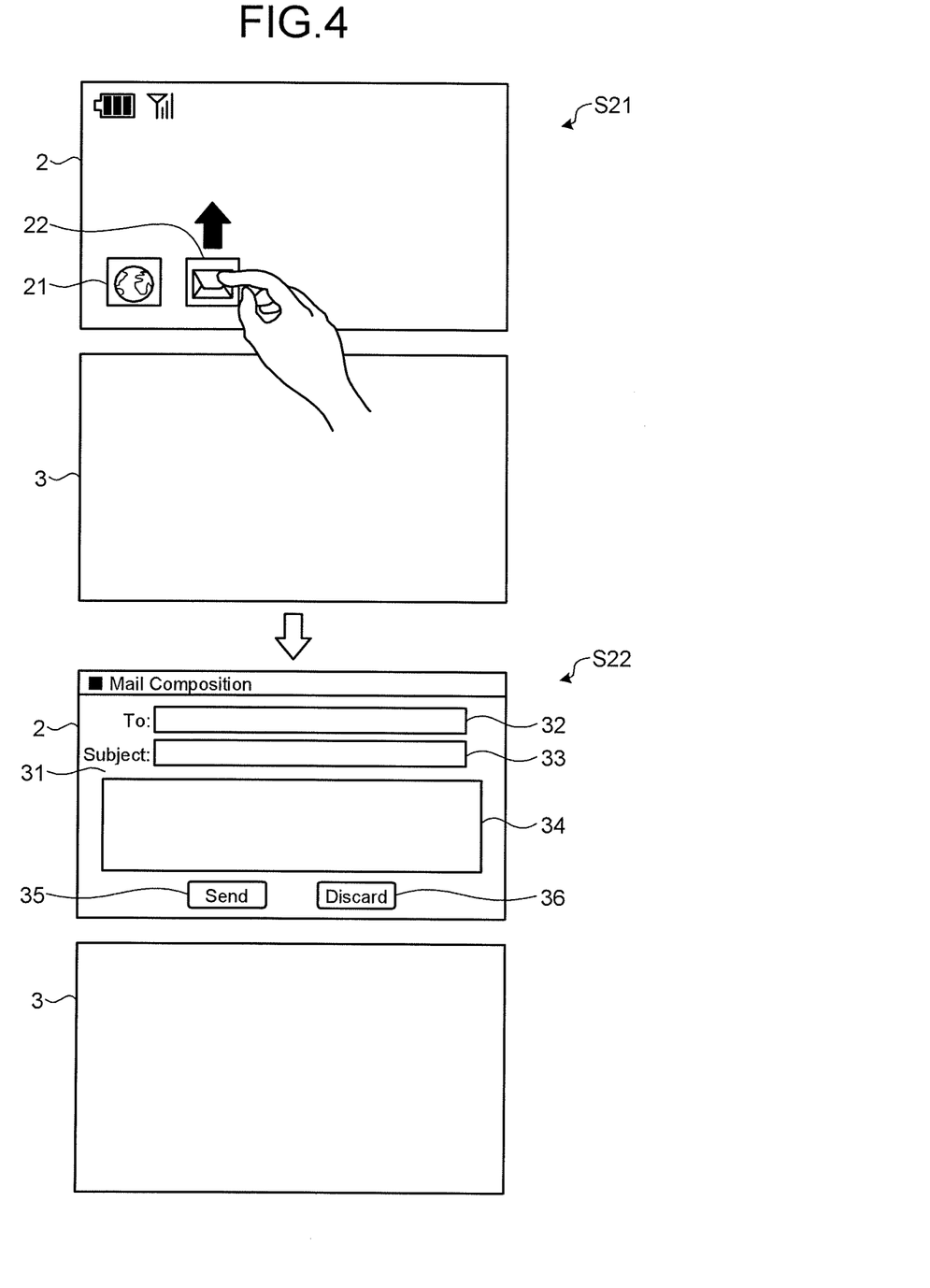
FIG. 4 is a diagram illustrating an example of displaying a screen on a first display unit.
Figure 5:
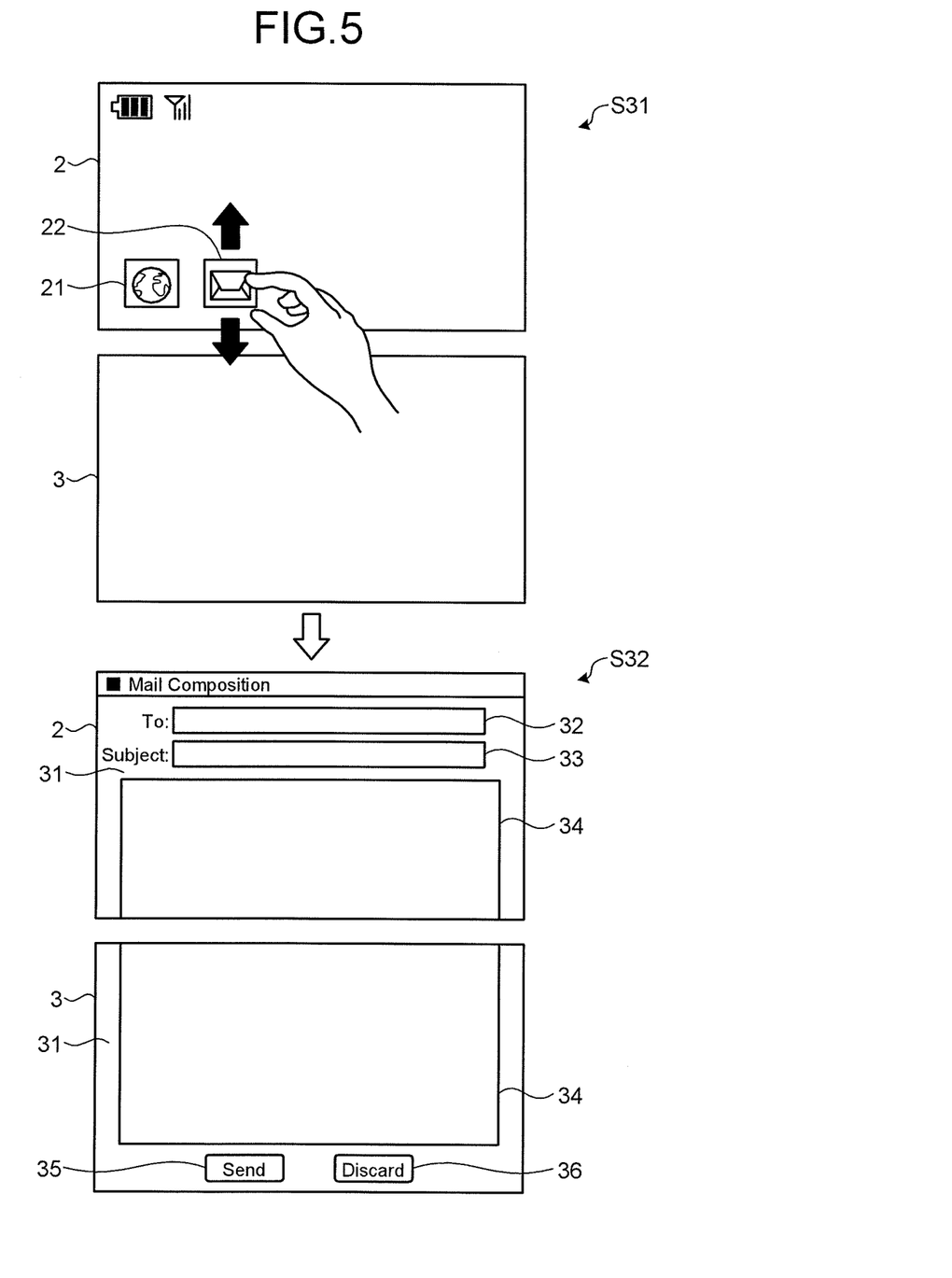
FIG. 5 is a diagram illustrating an example of displaying a screen over the first display unit and the second display unit.
Figure 6:
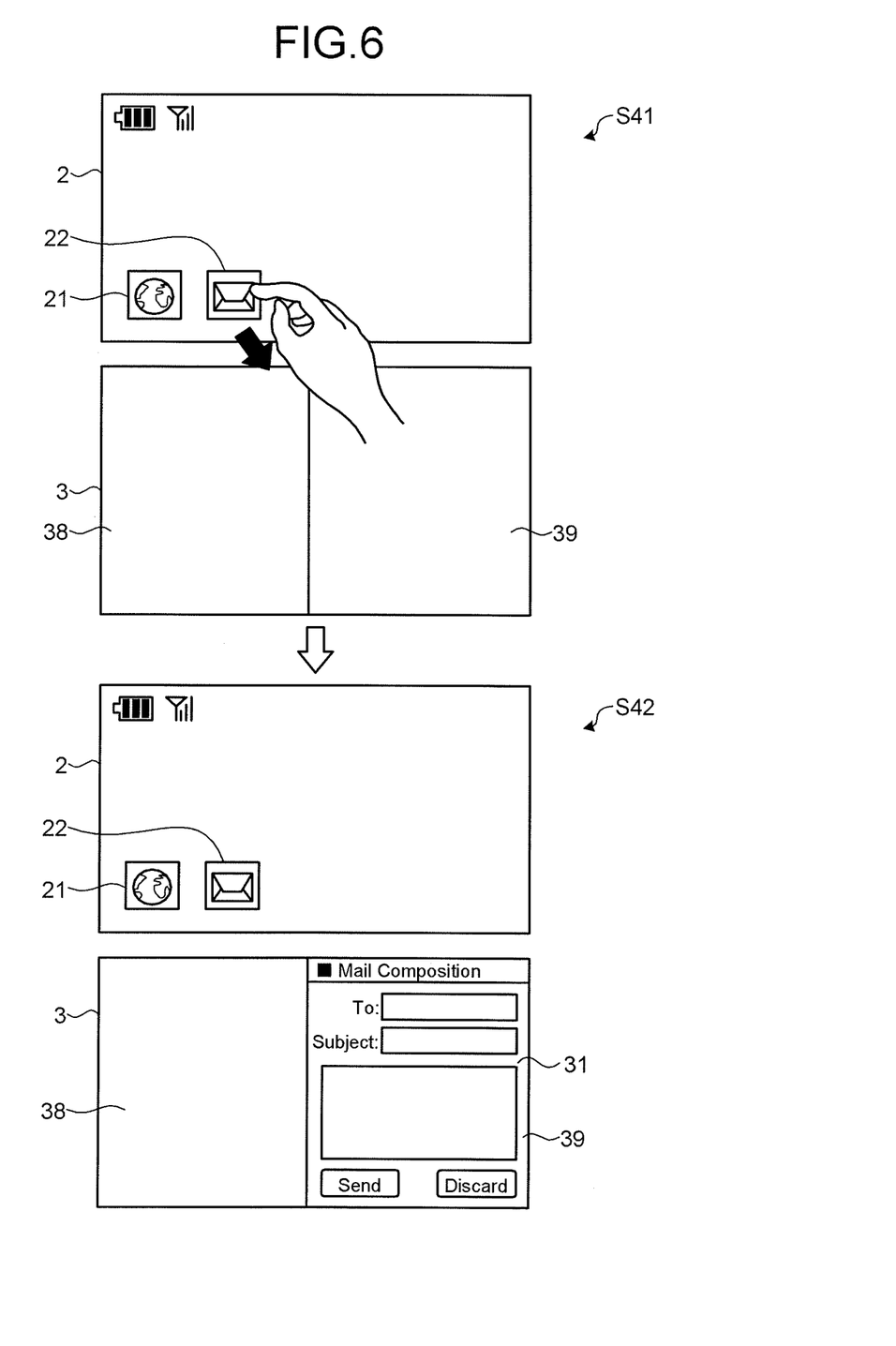
FIG. 6 is a diagram illustrating an example of displaying a screen in a divided display area.

Next, the display of a screen in the mobile phone terminal 1 will be explained with reference to FIG. 3 to FIG. 6. FIG. 3 is a diagram illustrating an example of displaying the screen on the second display unit. FIG. 4 is a diagram illustrating an example of displaying the screen on the first display unit. FIG. 5 is a diagram illustrating an example of displaying the screen over the first display unit and the second display unit. FIG. 6 is a diagram illustrating an example of displaying the screen in a divided display area. In the following explanation, the mobile phone terminal 1 is in the second form, and the touch panel 3 is therefore exposed to the outside.

At Step S11 illustrated in FIG. 3, a standby screen having an icon 21 and an icon 22 arranged therein is displayed on the touch panel 2. The icon 21 is an object used to activate a Web browsing function, and the icon 22 is an object used to activate an e-mail function. In the present embodiment, the icon 21 and the like formed from pictograms are displayed as objects in order to activate the functions provided in the mobile phone terminal 1. However, menu items, buttons, or so for activating the functions may be displayed as objects.

As used herein, a "standby screen" is a screen in a standby state awaiting incoming and outgoing calls, or a screen in a standby state awaiting activation of an application program. In other words, the "standby screen" is a screen before the screen is changed to any screen with each of various functions provided by the mobile phone terminal 1. The standby screen is sometimes called, for example, "initial screen", "desktop", "home screen", or "wallpaper". In the example illustrated in FIG. 3, a plain screen is displayed as the standby screen, however, image data or animation data may be displayed as the standby screen. Moreover, a dynamically changing portion like a calendar and a clock may be included as a part of the standby screen.

Here, it is assumed that the user performs on the icon 22 an operation with a movement in a direction in which the touch panel 3 is present. The operation with the movement is, for example, a flick operation or a dragging operation. A "flick" is an operation of touching a touch panel or a touch sensor, e.g., with a finger, and rapidly moving the finger as if to flick something. A "drag" or "dragging operation" is an operation of touching a touch panel or a touch sensor, e.g., with a finger, and moving the finger along the touch panel or the touch sensor while keeping the finger touched thereon. The operation with the movement is detected by the touch panel 2 as an operation such that a touch is started at a certain point on the touch panel 2 and then the touch point moves with the finger kept touched on the touch panel 2.

In this manner, when the operation with the movement is performed on the object and any other display unit different from the display unit displaying the object is present in the movement direction, the mobile phone terminal 1 activates a function corresponding to the object and displays a screen corresponding to the function on the display unit present in the movement direction. In the example illustrated in FIG. 3, the touch panel 3 is present in the movement direction of the operation performed on the icon 22. Therefore, at Step S12, the mobile phone terminal 1 activates the e-mail function corresponding to the icon 22 and displays a mail composition screen 31 provided by the e-mail function on the touch panel 3.

The mail composition screen 31 includes Address input box 32, Subject input box 33, Text input box 34, Send button 35, and Discard button 36.

At Step S21 illustrated in FIG. 4, similarly to Step S11 in FIG. 3, the standby screen having the icon 21 and the icon 22 arranged therein is displayed on the touch panel 2. Here, it is assumed that the user performs on the icon 22 an operation with a movement in a direction in which the touch panel 3 is not present.

In this manner, when the operation with the movement is performed on the object and there is not any display unit, different from the display unit displaying the object, in the movement direction, the mobile phone terminal 1 activates a function corresponding to the object, and displays a screen corresponding to the function on the display unit displaying the object. In the example illustrated in FIG. 4, there is no display unit other than the touch panel 2 in the movement direction of the operation performed on the icon 22. Therefore, at Step S22, the mobile phone terminal 1 activates the e-mail function corresponding to the icon 22, and displays the mail composition screen 31 provided by the e-mail function on the touch panel 2.

At Step S31 illustrated in FIG. 5, similarly to Step S11 in FIG. 3, the standby screen having the icon 21 and the icon 22 arranged therein is displayed on the touch panel 2. Here, it is assumed that the user performs on the icon 22 an operation with movements in a plurality of directions. The operation with the movements in the directions is, for example, a pinch operation. As used herein, a "pinch" is an operation of touching the touch panel with a plurality of fingers, and moving the fingers with the fingers kept touched on the touch panel so as to change a distance between the touch points of the fingers.

When the operation with the movements in the directions is performed on the object in the above manner, the mobile phone terminal 1 activates a function corresponding to the object and displays a screen corresponding to the function over a plurality of display units. In the example illustrated in FIG. 5, the pinch is performed on the icon 22. Therefore, at Step S32, the mobile phone terminal 1 activates the e-mail function corresponding to the icon 22, and displays the mail composition screen 31 provided by the e-mail function over the touch panel 2 and the touch panel 3.

The mobile phone terminal 1 can divide a display area of the display unit into a plurality of display areas and display a screen on each of the divided display areas. At Step S41 illustrated in FIG. 6, similarly to Step S11 in FIG. 3, the standby screen having the icon 21 and the icon 22 arranged therein is displayed on the touch panel 2. A display area of the touch panel 3 is divided into a display area 38 and a display area 39. Boundary between the display area 38 and the display area 39 is provided perpendicularly to a boundary line between the touch panel 2 and the touch panel 3.

Here, it is assumed that the user performs on the icon 22 an operation with a movement in a direction in which the touch panel 3 is present.

In this manner, when the operation with the movement is performed on the object and the display unit present in the movement direction is divided into the display areas, the mobile phone terminal 1 activates a function corresponding to the object and displays a screen corresponding to the function on the display area present in the movement direction. If a plurality of display areas are present in the movement direction, it is preferable to calculate a distance between the center (or the center of gravity) of a display area and a line extending in the movement direction for each of the display areas present in the movement direction, and to set a display area having a shortest distance as a display target of the screen. When there are a plurality of display areas in which the distance between the center and the line extending in the movement direction is shorter than a predetermined threshold, it is preferable to set a display area closest to the operated object as a display target of the screen.

In the example illustrated in FIG. 6, the display area of the touch panel 3 is divided into the display area 38 and the display area 39 in the movement direction of the operation, and the distance between the center of the display area 39 and the line extending from the icon 22 in the movement direction of the finger is shorter than the distance between the center of the display area 38 and the line. Therefore, at Step S42, the mobile phone terminal 1 activates the e-mail function corresponding to the icon 22 and displays the mail composition screen 31 provided by the e-mail function in the display area 39.

As explained above, when the operation with the movement is performed on the object, the mobile phone terminal 1 switches the display unit for displaying the screen provided by the function corresponding to the object, according to the movement direction. Therefore, the user can display a desired screen on an arbitrary display unit of the display units through a simple operation.

Figure 7:
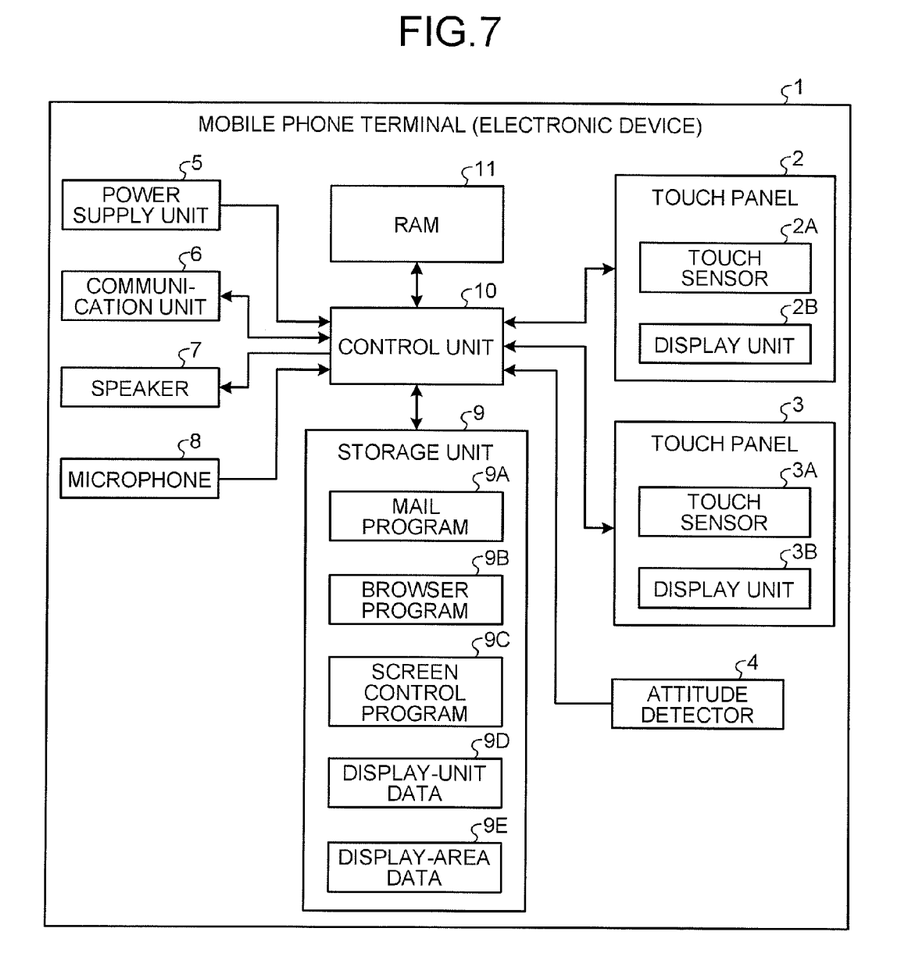
FIG. 7 is a block diagram illustrating a functional configuration of the mobile phone terminal.

Next, a functional configuration of the mobile phone terminal 1 will be explained below with reference to FIG. 7. FIG. 7 is a block diagram illustrating a functional configuration of the mobile phone terminal 1. The mobile phone terminal 1 includes the touch panel 2, the touch panel 3, an attitude detector 4, a power supply unit 5, a communication unit 6, a speaker 7, a microphone 8, a storage unit 9, a control unit 10, and a random access memory (RAM) 11. Each of the components may be provided in either one of the first housing 1A and the second housing 1B except that the touch panel 2 is provided on the first housing 1A and the touch panel 3 is provided on the second housing 1B.

The touch panel 2 includes a display unit 2B and a touch sensor 2A overlapped on the display unit 2B. The touch panel 3 includes a display unit 3B and a touch sensor 3A overlapped on the display unit 3B. The touch sensor 2A and the touch sensor 3A detect various operations (gestures) performed on the surfaces thereof as well as the positions on the surfaces where the operations are performed, respectively. The operations detected by the touch sensor 2A and the touch sensor 3A include a tapping operation of briefly touching the finger on the surface of the touch panel), a flick operation of rapidly moving the finger on the surface of the touch panel), and a dragging operation of moving the finger with the finger kept touched on the surface of the touch panel. Any detection methods, including but not limited to, a pressure sensitive type detection method and a capacitive type detection method, may be adopted as the detection method of the touch sensor 2A and/or the touch sensor 3A. The display unit 2B and the display unit 3B are formed with, for example, a liquid crystal display (LCD) and an organic electro-luminescence (organic EL) panel, and display characters, graphics, images, or the like.

The attitude detector 4 detects whether the mobile phone terminal 1 is in the first form or in the second form. The attitude detector 4 detects an attitude of the mobile phone terminal 1 using, for example, mechanical switches provided on faces of the first housing 1A and the second housing 1B that face each other.

The power supply unit 5 supplies electric power obtained from a battery or an external power supply to each of function units of the mobile phone terminal 1 including the control unit 10. The communication unit 6 establishes a wireless signal path using a code-division multiple access (CDMA) system, or any other wireless communication protocols, with a base station via a channel allocated by the base station, and performs telephone communication and information communication with the base station. Any other wired or wireless communication or network interfaces, e.g., LAN, Bluetooth, Wi-Fi, NFC (Near Field Communication) may also be included in lieu of or in addition to the communication unit 6. The speaker 7 outputs speech of the other party on the telephone communication, a ring tone, or the like. The microphone 8 converts the speech of the user or other captured sounds to electrical signals.

The storage unit 9 includes one or more non-transitory storage medium, for example, a nonvolatile memory (such as ROM, EPROM, flash card etc.) and/or a storage device (such as magnetic storage device, optical storage device, solid-state storage device etc.), and stores therein programs and data used for processes performed by the control unit 10. Specifically, the storage unit 9 stores therein a mail program 9A for implementing the e-mail function, a browser program 9B for implementing the Web browsing function, a screen control program 9C for providing the screen control, a display-unit data 9D storing therein information for dimensions of the display unit 2B and the display unit 3B and for a relationship therebetween, and a display-area data 9E storing therein information for divided display areas. The storage unit 9 also stores therein, in addition to the above ones, an operating system program for implementing basic functions of the mobile phone terminal 1, and other programs and data such as address book data in which names, telephone numbers, mail addresses, and the like are registered.

Figure 8:
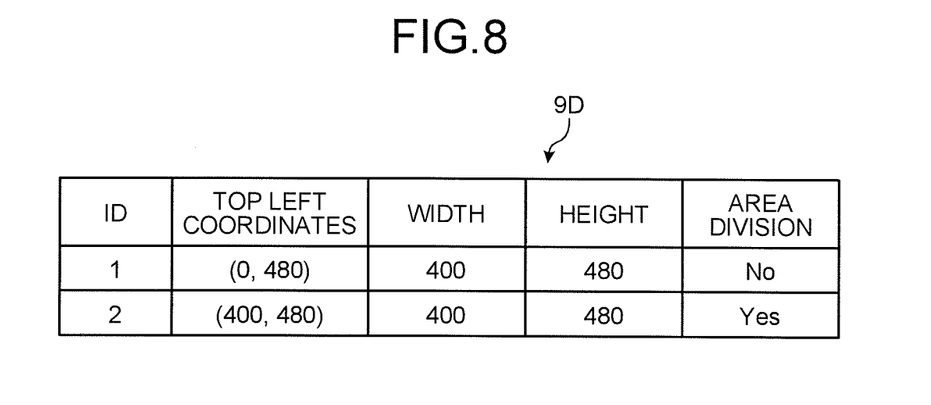
FIG. 8 is a diagram illustrating one example of display-unit data.
Figure 9:
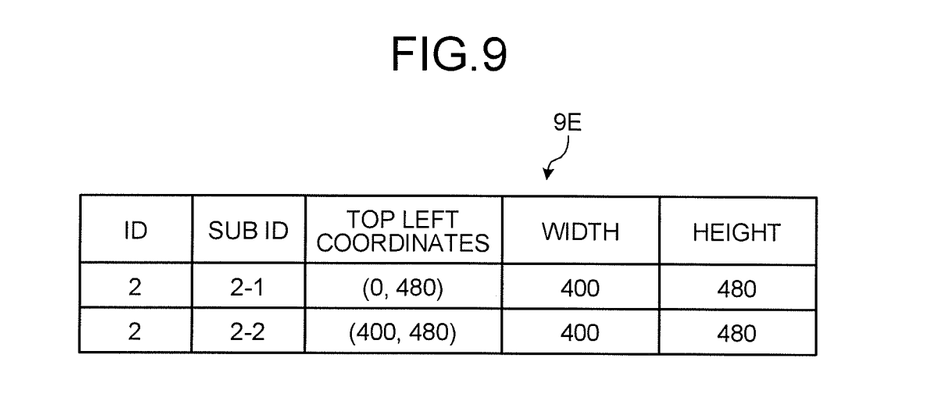
FIG. 9 is a diagram illustrating one example of display-area data.

The display-unit data 9D and the display-area data 9E will be explained below with reference to the drawings. FIG. 8 is a diagram illustrating one example of the display-unit data 9D. FIG. 9 is a diagram illustrating one example of the display-area data 9E.

As illustrated in FIG. 8, the display-unit data 9D includes items, such as ID, Top left coordinates, Width, Height, and Area division, and stores data for each display unit. Stored under the item ID is an identification number of the display unit. For example, "1" is an identification number of the display unit 2B, and "2" is an identification number of the display unit 3B. Stored under the item Top left coordinates are top left coordinates of the display unit assuming that the display units are on the same coordinate plane. Stored under the item Width is a width of the display unit, and a height of the display unit is stored under the item Height. In this example, the unit of coordinates and dimensions is pixel. Stored under the item Area division is a value that indicates whether the display unit is divided into a plurality of areas. For example, "Yes" indicates that the display unit is divided into areas, and "No" indicates that the display unit is not divided into areas.

As illustrated in FIG. 9, the display-area data 9E includes items, such as ID, Sub ID, Top left coordinates, Width, and Height, and stores therein data for each divided display area. Stored under the item ID is an identification number of the display unit provided with the display area. Stored under the item Sub ID is an identification number of the display area. Stored under the item Top left coordinates are top left coordinates of the display area on the same coordinate plane as that of the display-unit data 9D. Stored under the item Width is a width of the display area, and a height of the display area is stored under the item Height.

The value of the item of Area division in the display-unit data 9D and the data stored in the display-area data 9E are changed as necessary by the control unit 10 according to setting or so performed by the user. When both the display unit 2B and the display unit 3B are not divided into areas, the display-area data 9E is empty.

The control unit 10 is, for example, a central processing unit (CPU), and integrally controls the operations of the mobile phone terminal 1. Specifically, the control unit 10 executes the program(s) stored in the storage unit 9 while referring to the data stored in the storage unit 9 as necessary, and executes the various processes by controlling the touch panel 2, the communication unit 6, and the like. The control unit 10 loads the program stored in the storage unit 9 or the data acquired/generated/processed through execution of the processes to the RAM 11 that provides a temporary storage area, as required. The program executed by the control unit 10 and the data to be referred to may be downloaded from a server over wireless communication by the communication unit 6.

For example, the control unit 10 executes the mail program 9A, to implement the e-mail function. The control unit 10 also executes the screen control program 9C, to implement the function of displaying a screen on the display unit specified by the user in the above manner.

Next, a processing procedure executed by the control unit 10 based on the screen control program 9C will be explained with reference to FIG. 10. The processing procedure is executed, when the mobile phone terminal 1 is in the second form, each time a touch on an object such as an icon corresponding to an executable function is detected by the touch panel 2 or the touch panel 3.

Figure 10:
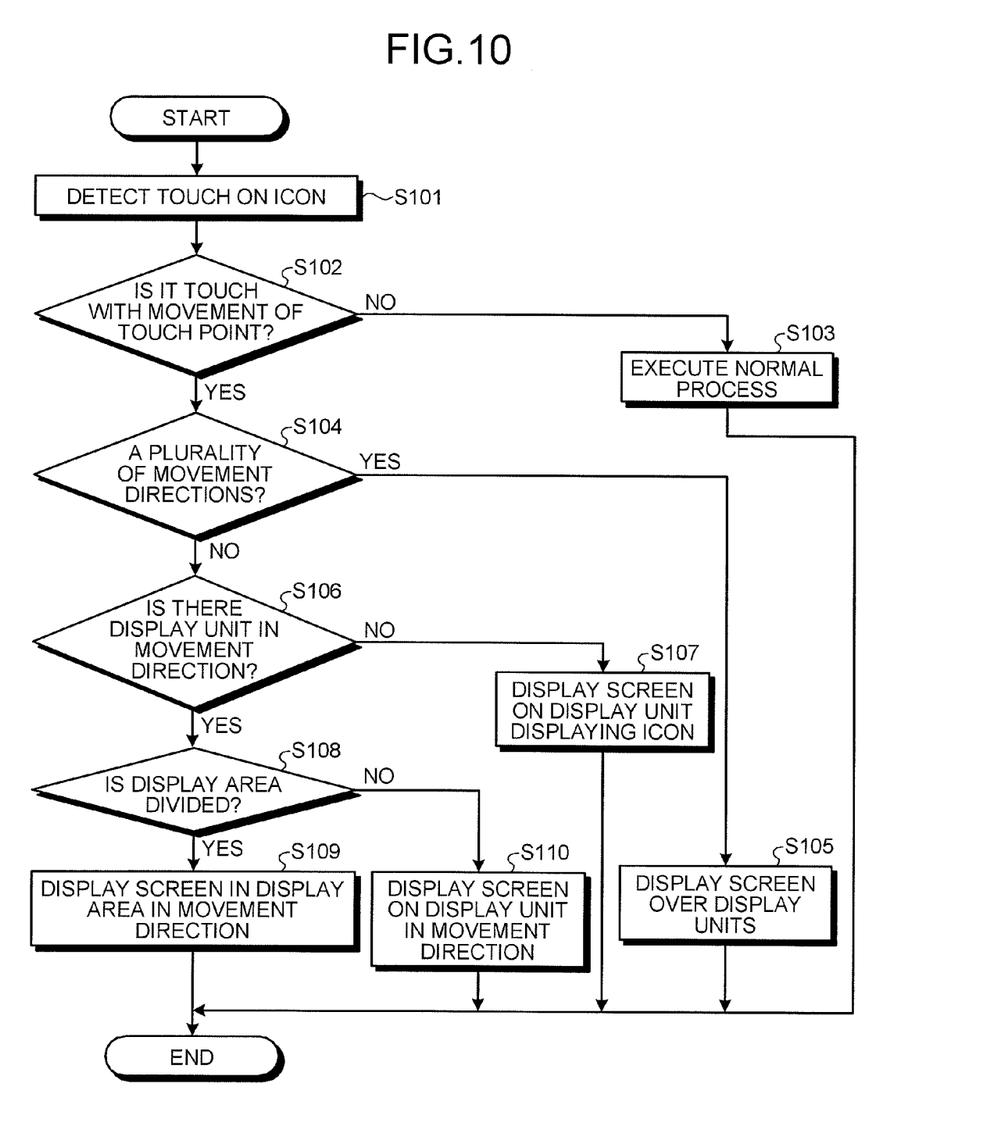
FIG. 10 is a flowchart illustrating an operation of a control unit when a touch on an icon corresponding to an executable function is detected.

FIG. 10 is a flowchart illustrating an operation of the control unit 10 when a touch on an icon corresponding to an executable function is detected. At Step S101, when a touch on an icon is detected by the touch panel 2 or the touch panel 3, the control unit 10 determines whether the touch is a touch with a movement of a touch point, at Step S102. The touch with the movement of the touch point is, for example, a touch detected when the flick operation or the dragging operation is performed.

When the touch on the icon is not the touch with the movement of the touch point (No at Step S102), then the control unit 10 executes a normal process performed when the touch without the movement of the touch point is detected, at Step S103. The normal process performed when the touch without the movement of the touch point is detected is, for example, a process of displaying explanation of the icon when the touch on the icon is continuously detected for a predetermined time or longer.

When the touch on the icon is the touch with the movement of the touch point (Yes at Step S102), the control unit 10 determines whether the touch is a touch with a plurality of movement directions, at Step S104. The touch with the movement directions is, for example, a touch detected when the pinch operation is performed. When the touch on the icon is the touch with the movement directions (Yes at Step S104), the control unit 10 activates the function corresponding to the touched icon and displays the screen provided by the function over a plurality of display units, at Step S105.

When the touch on the icon is not the touch with the movement directions (No at Step S104), the control unit 10 determines whether there is any other display unit, in the movement direction, different from the display unit displaying the touched icon, at Step S106. Whether there is any other display unit in the movement direction is determined by, for example, checking the position where the touch is detected and the movement direction of the detected touch against the display-unit data 9D.

When there is not any other display unit in the movement direction (No at Step S106), the control unit 10 activates the function corresponding to the touched icon, and displays the screen provided by the function on the display unit displaying the touched icon, at Step S107.

When there is any other display unit in the movement direction (Yes at Step S106), the control unit 10 determines whether the display area of the display unit in the movement direction is divided into a plurality of display areas, at Step S108. Whether the display area of the display unit is divided into the display areas is determined by, for example, referring to the display-unit data 9D.

When the display area of the display unit in the movement direction is divided into the display areas (Yes at Step S108), the control unit 10 activates the function corresponding to the touched icon, and displays the screen provided by the function on the display area in the movement direction, at Step S109. The display area in the movement direction is selected based on, for example, a distance between the center of each of the display areas and a line extending in the movement direction calculated using the data acquired from the display-area data 9E.

When the display unit in the movement direction is not divided into the display areas (No at Step S108), the control unit 10 activates the function corresponding to the touched icon, and displays the screen provided by the function on the display unit in the movement direction, at Step S110.

As explained above, the present embodiment is configured to switch a display unit that displays a screen according to the movement direction when the operation with a movement is performed on an object. Therefore, the user can display a desired screen on an arbitrary display unit.

The aspects of the embodiments can be arbitrarily changed without departing from the spirit and the scope of the present invention. For example, the screen control program 9C may be separated into a plurality of modules, or may be integrated with other programs.

The embodiment is configured that the mobile phone terminal 1 changes from the first form to the second form due to relative sliding of the first housing 1A and the second housing 1B. However, the change from the first form to the second form may be implemented by any operation other than the sliding operation. For example, the mobile phone terminal 1 may be a flip phone type terminal that couples the first housing 1A and the second housing 1B by a two-axis rotating hinge. In this case, by relatively rotating the first housing 1A and the second housing 1B around the two axes of the hinge as a rotation axis, the form is changed to the other. Moreover, the mobile phone terminal 1 may be an ordinary flip phone type terminal that couples the first housing 1A and the second housing 1B by a one-axis rotating hinge.

In the embodiment, when the touch due to the pinch operation is detected, the screen is displayed over a plurality of display units. However, when a touch due to any other operation such as a double-tap operation is detected, the screen may be displayed over the display units. A "double-tap" is an operation of repeating twice an operation of touching the touch panel with the finger and releasing therefrom the finger immediately so as to dab the icon or so.

The embodiment represents the example of the electronic device provided with the two display units, however, the present disclosure can be applied to any electronic device provided with three or more display units. When the electronic device provided with three or more display units displays a screen over a plurality of display units, the screen may be displayed over all the display units, or the screen may be displayed over previously selected display units.

Figure 11:
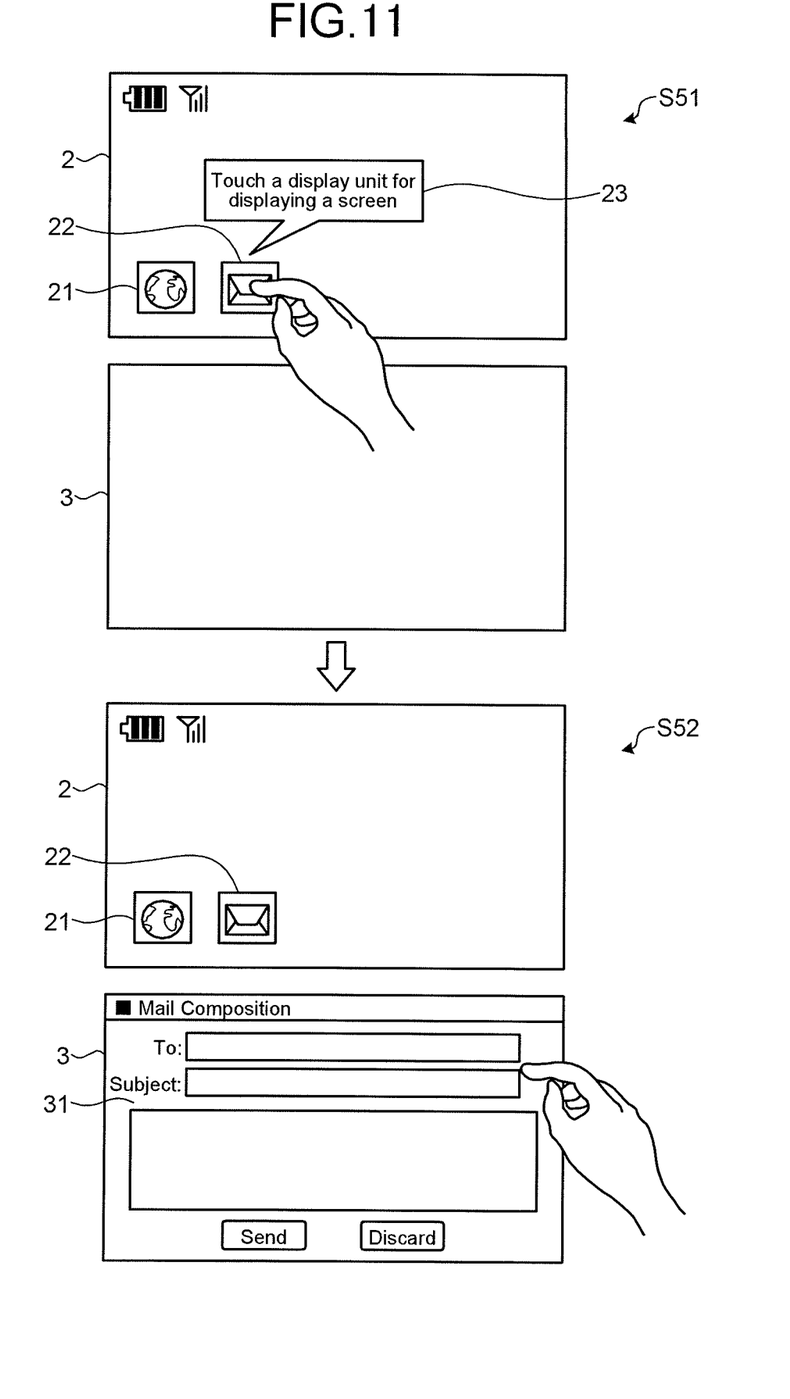
FIG. 11 is a diagram illustrating an example of other method of specifying a display unit for displaying the screen.

The embodiment is configured to specify on which of the display units the screen is displayed by the operation with a movement performed on the object. However, a display unit for displaying the screen may be specified by any other method. An example of other method of specifying a display unit for displaying the screen will be explained below with reference to FIG. 11. FIG. 11 is a diagram illustrating an example of other method of specifying a display unit for displaying the screen.

At Step S51 illustrated in FIG. 11, similarly to Step S11 in FIG. 3, the standby screen having the icon 21 and the icon 22 arranged therein is displayed on the touch panel 2. Here, it is assumed that the user touches the finger on the touch panel 2 within the display area including the icon 22 and the touch panel 2 detects the touch.

In this method, when the touch on the object is detected, the mobile phone terminal 1 prompts the user for on which of the display units the screen provided by the function corresponding to the object is to be displayed. In the example of FIG. 11, a message 23 "Touch a display unit for displaying the screen" is displayed on the touch panel 2.

When the touch on the touch panel 3 is detected by the touch panel 3 at Step S52, the mobile phone terminal 1 activates the e-mail function corresponding to the icon 22. The mobile phone terminal 1 then displays the mail composition screen 31 provided by the e-mail function on the touch panel 3.

The electronic device, the screen control method, and the screen control program according to the present invention can arbitrarily select a display unit for displaying a screen.

What is claimed is:

1. An electronic device, comprising:
a plurality of display units that include a first display unit for displaying an object corresponding to an executable function;
a detector for detecting a touch on the first display unit; and
a control unit for selecting, when the touch on the object is detected by the detector and then a movement of the touch is detected thereby, one or more display units among the plurality of display units for displaying a screen provided by the function corresponding to the object according to the movement of the touch, wherein the movement of the touch is detected on the first display unit; and
the control unit is configured to display the screen on the one or more display units, while keeping displaying the object on the first display unit.

2. The electronic device according to claim 1, wherein the control unit is configured to select the one or more display units for displaying the screen according to a direction of the movement of the touch.

3. The electronic device according to claim 1, wherein the control unit is configured to select, when, among the plurality of display units, there is no display unit other than the first display unit in a direction of the movement of the touch detected by the detector, the first display unit as the display unit for displaying the screen.

4. The electronic device according to claim 1, wherein the control unit is configured to display, when the movement of the touch detected by the detector includes a pinch operation in a plurality of moving directions, the screen over the display units.

5. The electronic device according to claim 1, wherein the display units include a second display unit whose display area is dividable into a first sub-display area and a second sub-display area, and
the control unit is configured to select, when the second display unit is in a direction of the movement of the touch detected by the detector, the first sub-display area as an area for displaying the screen, without displaying the screen in the second sub-display area.

6. The electronic device according to claim 1, wherein the control unit is configured to, in response to the detected movement of the touch, initiate the function corresponding to the object and cause the one or more display units to display the screen provided by the function.

7. The electronic device according to claim 1, wherein when (i) the screen is displayed on the one or more display units and (ii) a touch and a movement of the touch are detected by the detector on the object that is kept to be displayed on the first display unit,
the control unit is configured to change appearances of the screen based on the detected movement of the touch.

8. A screen control method executed by an electronic device including a detector and a plurality of display units that include a first display unit, the screen control method comprising:
displaying, on the first display unit, an object corresponding to an executable function;
detecting, by the detector, a touch on the object displayed on the first display unit and a movement of the touch, wherein the movement of the touch is detected on the first display unit; and
selecting, according to the movement of the touch, one or more display units among the plurality of display units for displaying a screen provided by the function corresponding to the object, while keeping displaying the object on the first display unit.

9. The screen control method according to claim 8, wherein the selecting includes, when the movement of the touch is detected by the detector to be in a moving direction, selecting the one or more display units for displaying the screen according to the direction of the movement of the touch.

10. The screen control method according to claim 8 wherein
the selecting includes selecting, when, among the plurality of display units, there is no display unit other than the first display unit in a direction of the movement of the touch detected by the detector, the first display unit as the display unit for displaying the screen.

11. The screen control method according to claim 8, wherein
the selecting includes displaying, when the movement of the touch detected by the detector includes a pinch operation in a plurality of moving directions, the screen over the display units.

12. The screen control method according to claim 8, wherein
the display units include a second display unit whose display area is dividable into a first sub-display area and a second sub-display area, and
the selecting includes selecting, when the second display unit is in a direction of the movement of the touch detected by the detector, the first sub-display area as an area for displaying the screen, without displaying the screen in the second sub-display area.

13. The screen control method according to claim 8, further comprising, in response to the detected movement of the touch:
  initiating the function corresponding to the object; and
  causing the one or more display units to display the screen provided by the function.

14. The screen control method according to claim 8, further comprising
  when (i) the screen is displayed on the one or more display units and (ii) a touch and a movement of the touch are detected by the detector on the object that is kept to be displayed on the first display unit,
  changing appearances of the screen based on the detected movement of the touch.

15. A non-transitory storage medium that stores a screen control program for causing, when executed by an electronic device which includes a detector and a plurality of display units that include a first display unit, the electronic device to execute
  displaying, on the first display unit, an object corresponding to an executable function;
  detecting, by the detector, a touch on the object displayed on the first display unit and a movement of the touch, wherein the movement of the touch is detected on the first display unit; and
  selecting, according to the movement of the touch, one or more display units among the plurality of display units for displaying a screen provided by the function corresponding to the object, while keeping displaying the object on the first display unit.

16. The storage medium according to claim 15, wherein
  the selecting includes selecting the one or more display units for displaying the screen according to a direction of the movement of the touch.

17. The storage medium according to claim 15, wherein
  the selecting includes selecting, when, among the plurality of display units, there is no display unit other than the first display unit in a direction of the movement of the touch detected by the detector, the first display unit as the display unit for displaying the screen.

18. The storage medium according to claim 15, wherein
  the selecting includes displaying, when the movement of the touch detected by the detector includes a pinch operation in a plurality of moving directions, the screen over the display units.

19. The storage medium according to claim 15, wherein
  the display units include a second display unit whose display area is dividable into a first sub-display area and a second sub-display area, and
  the selecting includes selecting, when the second display unit is in a direction of the movement of the touch detected by the detector, the first sub-display area as an area for displaying the screen, without displaying the screen in the second sub-display area.

20. The storage medium according to claim 15, wherein the screen control program is configured to cause the electronic device to execute, in response to the detected movement of the touch,
  initiating the function corresponding to the object; and
  causing the one or more display units to display the screen provided by the function.

21. The storage medium according to claim 15, wherein the screen control program is configured to cause the electronic device to further execute
  when (i) the screen is displayed on the one or more display units and (ii) a touch and a movement of the touch are detected by the detector on the object that is kept to be displayed on the first display unit,
  changing appearances of the screen based on the detected movement of the touch.

* * * * *